(12) United States Patent
Golab et al.

(10) Patent No.: US 10,240,916 B1
(45) Date of Patent: Mar. 26, 2019

(54) METHOD AND APPARATUS FOR CALIBRATING AN INSPECTION SYSTEM FOR MOVING VEHICLES

(71) Applicant: Hunter Engineering Company, St. Louis, MO (US)

(72) Inventors: Thomas J. Golab, St. Peters, MO (US); Bruce E. Bernard, St. Charles, MO (US); Michael T. Stieff, Wentzville, MO (US); Brian M. Cejka, Fenton, MO (US)

(73) Assignee: Hunter Engineering Company, St. Louis, MO (US)

( * ) Notice: Subject to any disclaimer, the term of this patent is extended or adjusted under 35 U.S.C. 154(b) by 68 days.

(21) Appl. No.: 15/398,401

(22) Filed: Jan. 4, 2017

Related U.S. Application Data

(60) Provisional application No. 62/275,075, filed on Jan. 5, 2016.

(51) Int. Cl.
*G01B 11/27* (2006.01)
(52) U.S. Cl.
CPC .................................. *G01B 11/27* (2013.01)
(58) Field of Classification Search
None
See application file for complete search history.

(56) References Cited

U.S. PATENT DOCUMENTS

| | | | |
|---|---|---|---|
| 4,123,023 A | 10/1978 | Nelson | |
| 4,153,131 A | 5/1979 | Sakata et al. | |
| 4,341,021 A | 7/1982 | Beissbarth | |
| 4,745,469 A | 5/1988 | Waldecker et al. | |
| 4,863,266 A | 9/1989 | Masuko et al. | |
| 4,899,218 A | 2/1990 | Waldecker et al. | |

(Continued)

FOREIGN PATENT DOCUMENTS

| | | |
|---|---|---|
| JP | 63094103 | 4/1988 |
| JP | 11120480 | 4/1999 |

(Continued)

OTHER PUBLICATIONS

Sensing Solutions—Automotive Industry, pp. 1-12, 2005, Keyence Corporation, Product Lit. No. SS05S-Auto-KA-L-E3085-1, Japan.

(Continued)

*Primary Examiner* — Mohammad J Rahman
(74) *Attorney, Agent, or Firm* — Sandberg Phoenix & von Gontard, P.C.

(57) ABSTRACT

A method and apparatus for calibrating laser displacement sensors within a vehicle inspection system. A calibration target structure is positioned within an operative field of view for the laser displacement sensor, providing one or more optical targets onto which illuminating laser beams from the laser displacement sensor are projected. Displacement measurements are acquired with the optical targets disposed at a plurality of positions within the field of view. The resulting displacement measurements, together with known position information for the optical targets, are utilized to calibrate an associated imaging sensor such that the displacement measurements associated with each illuminating laser beam and known positional information agree to within a desired tolerance throughout the operative field of view for the laser displacement sensor.

16 Claims, 8 Drawing Sheets

(56) References Cited

U.S. PATENT DOCUMENTS

| | | | |
|---|---|---|---|
| 5,220,399 | A | 6/1993 | Christian et al. |
| 5,268,731 | A | 12/1993 | Fuchiwaki et al. |
| 5,532,816 | A | 7/1996 | Spann et al. |
| 5,600,435 | A | 2/1997 | Bartko et al. |
| 5,731,870 | A | 3/1998 | Bartko et al. |
| 5,793,492 | A | 8/1998 | Vanaki |
| 5,812,256 | A | 9/1998 | Chapin et al. |
| 5,818,574 | A | 10/1998 | Jones et al. |
| 5,978,077 | A * | 11/1999 | Koerner ............... G01B 11/275 356/139.09 |
| 6,151,562 | A | 11/2000 | Merrill |
| 6,412,183 | B1 | 7/2002 | Uno |
| 6,545,750 | B2 | 4/2003 | Roth et al. |
| 6,559,936 | B1 | 5/2003 | Colombo et al. |
| 6,657,711 | B1 | 12/2003 | Kitagawa et al. |
| 6,748,796 | B1 | 6/2004 | Van Den Bossche |
| 6,894,771 | B1 | 5/2005 | Dorrance et al. |
| 7,177,740 | B1 | 2/2007 | Guangjun et al. |
| 7,336,350 | B2 | 2/2008 | Dorrance et al. |
| 7,454,841 | B2 | 11/2008 | Burns, Jr. et al. |
| 7,774,946 | B2 | 8/2010 | Boni et al. |
| 7,864,309 | B2 | 1/2011 | De Sloovere et al. |
| 8,107,062 | B2 | 1/2012 | De Sloovere et al. |
| 8,548,671 | B2 * | 10/2013 | Wong ..................... G01C 25/00 701/29.1 |
| 9,377,379 | B2 | 6/2016 | Lee |
| 2002/0027651 | A1* | 3/2002 | Jackson ............. G01B 11/2755 356/139.09 |
| 2003/0094039 | A1 | 5/2003 | Poulbot |
| 2003/0142294 | A1 | 7/2003 | Jackson et al. |
| 2006/0090356 | A1 | 5/2006 | Stieff |
| 2006/0152711 | A1 | 7/2006 | Dale, Jr. et al. |
| 2007/0044537 | A1 | 3/2007 | Knox |
| 2007/0124949 | A1 | 6/2007 | Burns, Jr. et al. |
| 2010/0180676 | A1 | 7/2010 | Braghiroli et al. |
| 2010/0274514 | A1* | 10/2010 | Kamachi ................ G01B 21/26 702/94 |
| 2013/0158777 | A1 | 6/2013 | Brauer et al. |
| 2014/0129076 | A1 | 5/2014 | Mouchet et al. |
| 2014/0253908 | A1 | 9/2014 | Lee |
| 2014/0310967 | A1 | 10/2014 | Nagornov |
| 2014/0365061 | A1* | 12/2014 | Vasquez ................. G05D 1/021 701/23 |
| 2014/0368635 | A1* | 12/2014 | Ohren .................... G01B 11/00 348/87 |
| 2015/0059458 | A1 | 3/2015 | Lee |
| 2015/0219785 | A1 | 8/2015 | Tudor et al. |
| 2016/0109229 | A1* | 4/2016 | Yeum .................... G01B 11/27 33/194 |
| 2016/0282228 | A1 | 9/2016 | Lee |

FOREIGN PATENT DOCUMENTS

| | | |
|---|---|---|
| JP | 5371299 B2 | 12/2013 |
| WO | 2014134719 A1 | 9/2014 |
| WO | 2014151666 A1 | 9/2014 |

OTHER PUBLICATIONS

CCD Laser Displacement Sensor General Catalog LK-G Series, pp. 1-22, 2006, Keyence Corporation, Product Lit. No. LKG-KA-C3-E 0076-1, Japan.

CCD Laser Displacement Sensor General Catalog LK-G Series, pp. 1-22, 2006, Keyence Corporation, Product Lit. No. LKG-WW-C3-E 0096-1, Japan.

K. De Sloovere, W. Pastorius, PH.D, Wheel Alignment Goes 3-D, pp. 1-5, Nov. 5, 2010, Quality Digest Magazine, www.qualitydigest.com.

x-3Dprofile—Dürr Reinvents Wheel Geometry Measurement, pp. 1-2, 2007, Dürr Assembly Products, www.durr.com.

Optima Laser Distance Sensor, pp. 1-2, Mar. 2004, BS2 Multidata GmbH, www.bs-multidata.com.

SIDIS 3D-CAM Wheel Alignment Benches With Innovative Measuring System, pp. 1-8, 2010, Siemens AG, Germany.

Banalogic, Fastlign—The Gold Standard in Vehicle Alignment and Tracking Verification, Banalogic Corp. product literature, pp. 1-4, Oct. 2013, Raleigh, USA.

Expert Solutions—Automotive Industry, pp. 1-4, 2009, Keyence Corporation, Product Lit. No. MeasureExpertAuto-KA-EN0630-E 1034-4, Japan.

* cited by examiner

METHOD AND APPARATUS FOR CALIBRATING AN INSPECTION SYSTEM FOR MOVING VEHICLES

CROSS-REFERENCE TO RELATED APPLICATIONS

The present application is related to, and claims priority from, U.S. Provisional Patent Application Ser. No. 62/275,075 filed on Jan. 5, 2016, and which is herein incorporated by reference.

STATEMENT REGARDING FEDERALLY SPONSORED RESEARCH

Not Applicable.

BACKGROUND OF THE INVENTION

The present application is related to a vehicle inspection or measurement system configured to utilize displacement sensors on opposite sides of a vehicle inspection lane to acquire measurement data associated with various components of a vehicle as the vehicle moves through the inspection lane, and in particular, to methods and apparatus for calibration of a set of laser displacement sensors utilized during the inspection or measurement of moving vehicles.

Systems for measuring or inspecting vehicle properties, such as wheel alignment and associated parameters, are traditionally set up to obtain measurements to a high degree of accuracy under controlled conditions, such as with the vehicle disposed in a stationary location on a level floor surface or alignment lift rack. These vehicle measurement or inspection systems may require the temporary placement of various inclinometers or optical targets on the vehicle wheels, from which data is acquired to determine the various measurements. In general, vehicle wheel alignment measurement or inspection procedures require a technician to spend time preparing the vehicle for measurements, acquiring the measurements, and optionally performing adjustments necessary to correct any identified problems. Often, a vehicle brought in to a shop for other services may unknowingly be in need of an alignment service as well. However, unless the service technician and the vehicle owner are willing to spend the time required to prepare the vehicle for measurement and proceed with an alignment measurement process, alignment issues will likely remain undetected and unrepaired.

In response to the recognized need for a way to quickly identify vehicles which may require an alignment service, various quick check or dedicated inspection systems have been introduced to the market, such as the Quick Check® System from Hunter Engineering Co. of St. Louis, Mo. These systems provide an operator with the tools and procedures necessary to obtain basic measurements of important vehicle wheel alignment angles, enter vehicle identifying information (such as through a VIN barcode scan), and review vehicle diagnostic information such as battery condition, tire tread depth, and on-board diagnostic messages. If a vehicle quick check or inspection reveals a potential out-of-specification measurement or problem, it can be brought to the attention of the vehicle owner, who may then elect to proceed with a more in-depth vehicle service procedure, such as a full vehicle wheel alignment service using specialized precision equipment.

Often, vehicle quick check or inspection systems require a technician to carry out various tasks during the process, including attachment of optical targets or angle sensors to the wheels of the vehicle, manual measurement of tire tread depths, and the coupling of scanner component to vehicle data ports. In order for the technician to complete these tasks, the vehicle must be stationary for part of the time, such as for the attachment (and subsequent removal) of optical targets or angle sensors. This necessitates establishing a routine or procedure which must be followed by a technician each time a vehicle is brought into the shop for service. During busy times, or when multiple customers are waiting, a technician may not have sufficient time to carry out these routines or procedures for every vehicle, potentially failing to identify vehicles in need of additional services.

Vehicle wheel alignment systems have utilized a variety of techniques for non-contact measurement of stationary vehicle wheel assembly parameters, from which vehicle wheel alignment angles can be determined. For example, by utilizing multiple displacement measurement sensors, distances between known sensor locations and locations on a stationary vehicle wheel assembly can be measured. Processing the acquired measurements from displacement sensors observing wheels on opposite sides of an axle can identify planes parallel to the wheel assembly surfaces, from which representations of total toe and camber angles for the vehicle can be determined. In other configurations, two-dimensional images of a stationary vehicle wheel assembly are acquired, and image processing algorithms utilized to identify geometric features such as the wheel rim edge, from which a perspective analysis can be performed to determine estimates of vehicle wheel assembly spatial position and orientation. Alternatively, structured light patterns, such as multiple laser lines, or colored stripes, can be projected onto the stationary wheel assembly surface and observed by an imaging system. Deviations in the projected pattern are analyzed to generate representations of the illuminated surfaces, from which vehicle wheel assembly spatial position and orientation can be estimated. In general, these systems require the vehicle to remain stationary relative to the sensors during the measurement acquisition procedure, but some non-contact measurement systems require either the wheel assembly or the sensors be rotated in place about a stationary axis of rotation during the measurement acquisition procedure.

Some non-contact measurement systems can acquire measurements as a vehicle wheel assembly is both rotated and translated past the sensors, i.e., as the vehicle is moved past the sensors. For example, using laser displacement sensors to measure a distance between a fixed sensor and various points on vehicle wheel assemblies on opposite sides of a vehicle as a vehicle is driven at a slow speed between the sensors, enables a system to acquire measurement data along horizontal slices of the wheel assemblies, from which approximations of the wheel spatial orientations can be derived. These types of systems are highly influenced by the speed at which the vehicle travels between the sensors, the angle (straightness) of vehicle travel relative to the sensor observation axis, suspension movement, and changes in steering of the vehicle as it passes between sensors. Measurements acquired from a moving vehicle are useful to provide a vehicle service quick check or audit inspection, capable of identifying vehicles which may be in need of a further, more precise, alignment inspection and/or adjustment. However, in order to provide meaningful information, it is necessary that the measurements acquired from the moving vehicle are substantially representative of the alignment of the moving vehicle components, and do not introduce errors due to improper calibration of the associated laser displacement sensors.

Accordingly, it would be advantageous to provide a method and apparatus by which the laser displacement sensors utilized in a non-contact measurement or inspection system for a moving vehicle can be calibrated to provide displacement measurements which are sufficiently accurate to measure the alignment of vehicle components to within an acceptable tolerance of measurements acquired from a stationary vehicle using a traditional vehicle wheel alignment measurement system.

It would be further advantageous to provide, for non-contact measurement or inspection systems for a moving vehicle utilizing a plurality of laser displacement sensors, a method and apparatus by which the plurality of laser displacement sensors can be calibrated together to ensure that displacement measurements from each laser displacement sensor are accurate relative to each other to within an acceptable tolerance. Similarly, for a plurality of laser displacement sensors arrayed together in a non-contact measurement or inspection system, it would be beneficial to ensure that laser beams emitted by each sensor are optically consistent to within an acceptable tolerance for spot dispersion, illumination intensity, and other optical characteristics.

BRIEF SUMMARY OF THE INVENTION

Briefly stated, in a first embodiment of the present disclosure, a method is provided for calibrating a laser displacement sensor utilized in a non-contact measurement or inspection system, to provide displacement measurements of a moving vehicle which are sufficiently accurate to within an acceptable tolerance of measurements acquired from a stationary vehicle using a traditional vehicle wheel alignment measurement system. A calibration target structure is positioned within an operative field of view for the laser displacement sensor, providing one or more optical targets onto which illuminating laser beams from the laser displacement sensor are projected. With the optical targets disposed at a plurality of positions within the sensor field of view, displacement measurements based on reflected laser light are acquired from individual imaging sensors. The resulting displacement measurements, together with known position information for the optical targets, are utilized to calibrate individual imaging sensors within the laser displacement sensor, such that the displacement measurements associated with each illuminating laser beam, and the known positional information of the optical targets, agree to within a desired tolerance throughout the operative field of view for the laser displacement sensor.

In a further embodiment of the present disclosure, a calibration apparatus is provided for a non-contact measurement or inspection system having a laser displacement sensor configured with at least two laser emitters and an imaging sensor to acquire displacement measurements to the surfaces of a moving vehicle. The calibration apparatus provides an adjustable support framework carrying one or more optical targets for illumination by each of the laser emitters and observation by the associated imaging sensor. The adjustable support framework is configured for alignment relative to a reference, such as gravity, and to linearly move the optical targets within the operational range of the non-contact measurement or inspection system. Each optical target is configured to reduce the effects of laser speckle using either a rotational movement, translational movement, or a combination thereof.

In yet another embodiment of the present disclosure, a calibration apparatus is provided for a non-contact measurement or inspection system having two or more laser displacement sensors each configured with at least two laser emitters and an associated imaging sensor to acquire displacement measurements to the surfaces of a moving vehicle. The calibration apparatus provides an adjustable support framework carrying a set of optical targets for illumination by at least two laser emitters from each of said displacement sensors, and for observation by the associated imaging sensors. The adjustable support framework is configured for alignment relative to a reference, such as gravity, and to linearly move the optical targets within the operational range of the non-contact measurement or inspection system. Each optical target is configured to reduce the effects of laser speckle using either a rotational movement, translational movement, or a combination thereof.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
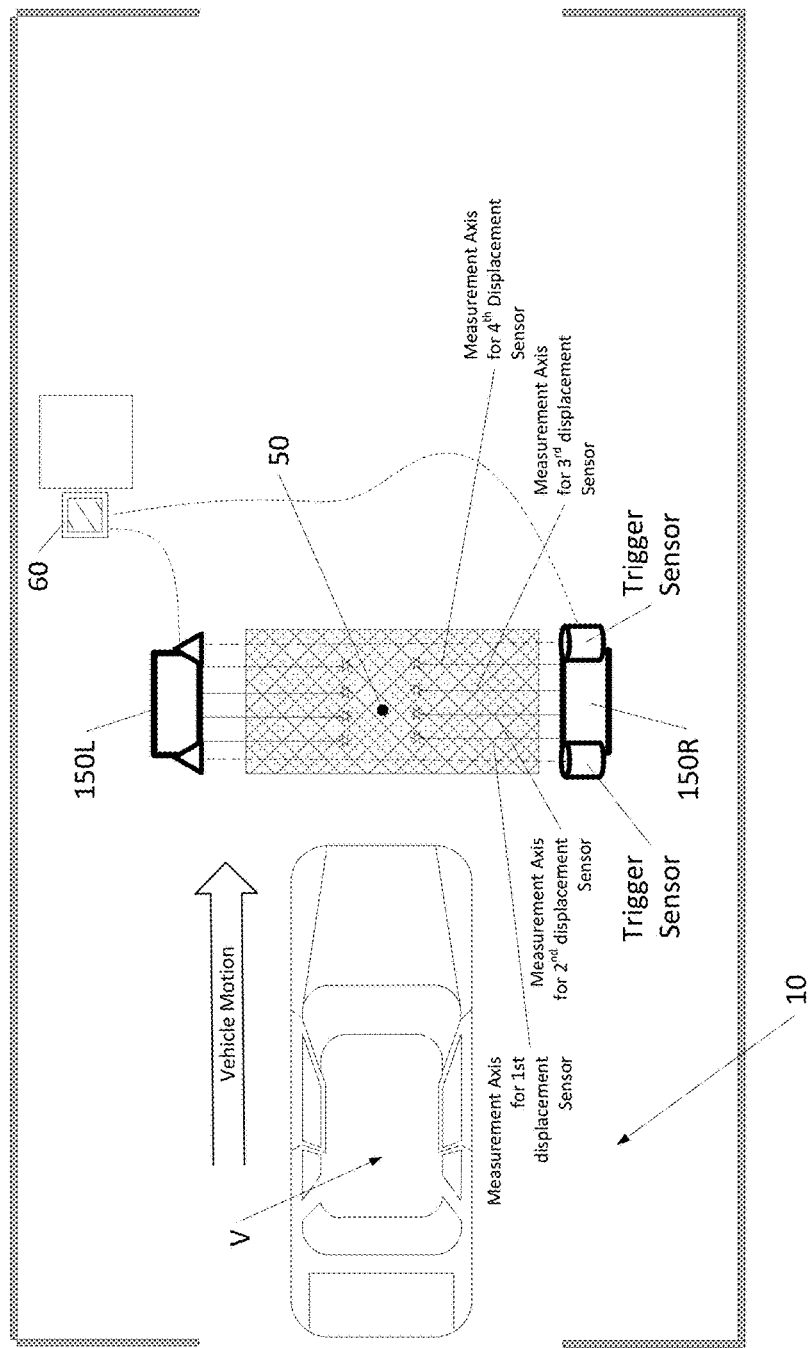
FIG. 1 is a top plan view of a prior art vehicle inspection lane, illustrating an exemplary configuration and placement location for displacement sensor units in a drive-through configuration.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Since the present application describes features which exist on opposite lateral sides of a vehicle inspection lane, but which are otherwise identical, it will be understood that the use of the reference designations Left and Right, or L and R as in the Figures, identify corresponding components utilized at locations relative the left and right lateral sides of a vehicle or vehicle inspection lane. For example, a sensor unit described generically as 150 will be designated as 150R and 150L when specifically shown or described at either the right or left side of the vehicle inspection lane 10 as seen in FIG. 1.

A vehicle measurement system such as shown in FIG. 1 is generally intended for use in a vehicle service shop drive-through configuration, where a moving vehicle V is driven through a sensing region 50 within the vehicle service or inspection lane 10, in a generally straight line (but not necessarily along, or parallel to, a longitudinal midline of the vehicle service or inspection lane 10), While driven, the vehicle is observed by various sensors 150 acquiring measurement data, and optionally, acquiring vehicle-associated still-frame or motion video images.

The array of sensors provides an operator with an initial diagnostic overview of the moving vehicle V with minimal operator interaction, and may include displacement sensors 150 for acquiring data related to vehicle wheel alignment, drive-over tire tread depth sensors for measuring tire wear conditions (not shown), and drive-over tire pressure measurement sensors for measuring tire inflation conditions (not shown). Machine vision systems (not shown) may be included for recording vehicle body panels for damage or misalignment, for observing tire sidewall markings to identify tire parameters, and/or for capturing vehicle identifying information such as license plate data. Depending upon the configuration of the various sensors observing the vehicle V as it moves through the sensing region 50, an operator may be provided, at an operator console 60, with a detailed report on the condition of multiple components of the vehicle V, recalled vehicle and customer records, and recommended service and replacement parts without the need to manually identify, record, or retrieve any data.

In an exemplary configuration, one or more sensor assemblies or units 150, each containing at least one displacement sensor system 200, are disposed on each lateral side of the sensing region 50 to observe the opposite sides of the vehicle V moving through the sensing region 50. Each displacement sensor system 200 is associated with an operational range or field of view within which the displacement sensor system 200 is capable of measuring, to within a desired tolerance, a distance to an observed surface. Given the wide variation in configurations of vehicles V, each displacement sensor system 200 is preferably disposed such that the observed surfaces for each side of an intended collection of vehicle configurations will pass through the associated operational ranges or fields of view. Data from the displacement sensor systems 200 is conveyed to a processing system (local or remote) configured with suitable software instructions to control and/or communicate with the various displacement sensor systems, receive data therefrom, analyze the received data, receive operator input such as laser settings, camera settings, or processing algorithm selections, and to convey resulting measurements to an output or data storage system. The operator input and output may be conveyed through a suitably configured operator console 60, or communicated via a suitable communications network to a remote device such as a tablet, cell phone, or workstation (not shown).

Each sensor unit 150 consists of a support framework configured as necessary to mount at least one displacement sensor system 200, or preferably, two or more laterally spaced displacement sensor systems 200, such that an operative field of view for each displacement sensor system 200 encompasses observable lateral side surfaces associated with a range of measurable vehicles V traversing the sensing region 50 of the inspection lane 10. Displacement sensors systems 200 preferably consists of a set of laser displacement sensors, but those of ordinary skill in the art will recognize that other types of displacement sensors, including 2D imaging, time-of-flight optical sensors, and ultrasonic sensors capable of obtaining displacement measurements to surfaces within a field of view may be utilized. Provisions may be included within each sensor unit 150 for additional other types of sensors associated with a vehicle inspection system.

Within a sensor unit 150 containing multiple displacement sensor systems 200, a lateral spacing between the displacement sensor systems 200, as well as an associated vertical position of each, may be either random or determined, with each displacement sensor system 200 functioning as an independent measurement sensor to contribute measurement data to a collection of displacement measurements associated with a vehicle V passing through the inspection lane 10. Displacement measurement data acquired from multiple points or locations on the surfaces of a passing vehicle V, such as from individual wheel assemblies 104, as the vehicle moves through the sensing region 50 of the inspection lane 10 is utilized by the suitably configured processing system to establish average displacement measurements associated with select features on the vehicle, to discard outlier displacement measurements using tolerance ranges or other statistical analysis techniques, and/or to detect and identify changes in vehicle velocity (braking or accelerating), oscillations in the vehicle suspension (such as from driving over a raised lip or recessed drain in the inspection lane floor surface), and/or steering changes as the vehicle V passes through the vehicle inspection lane 10.

Figure 2:
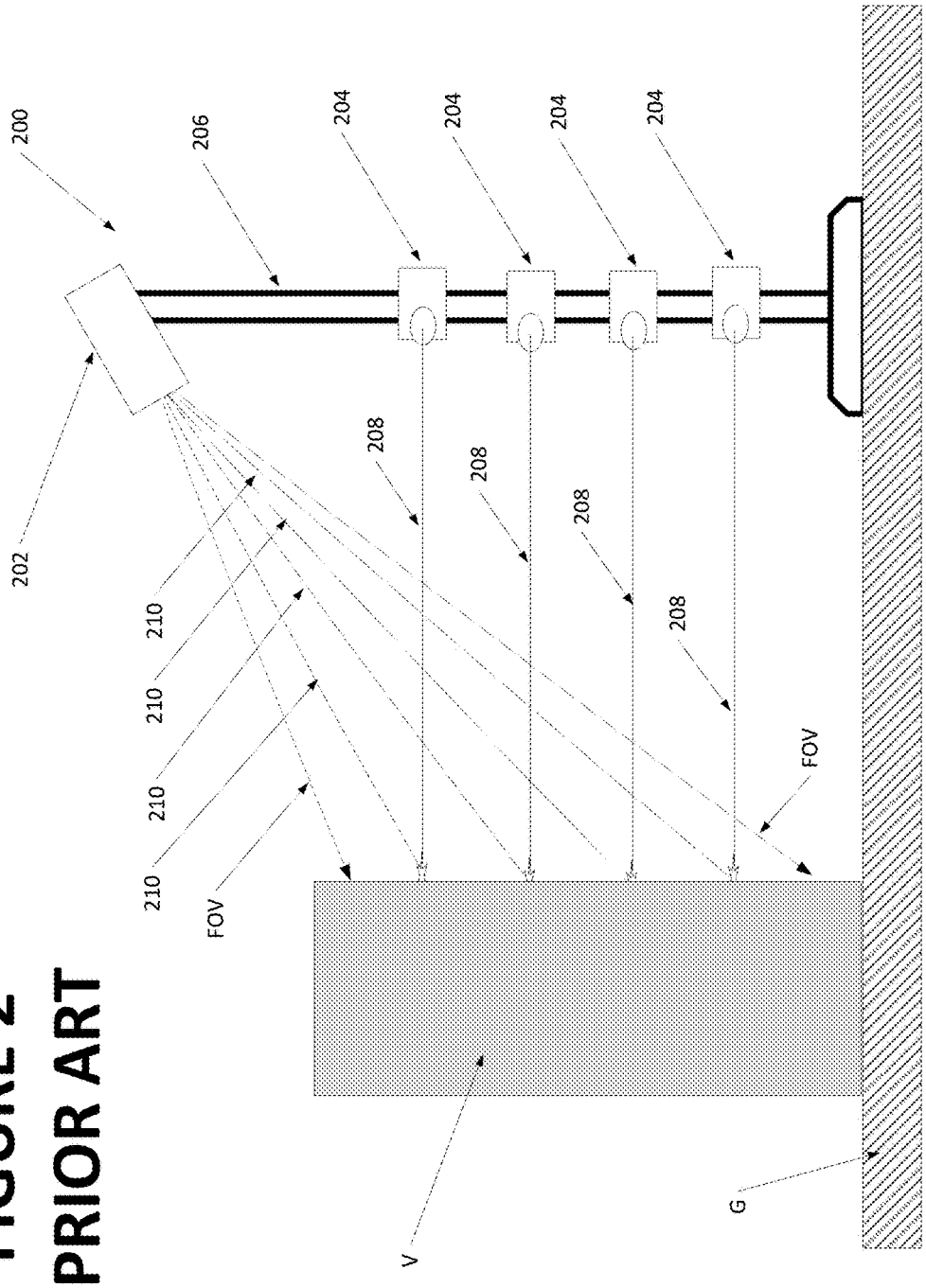
FIG. 2 is a side view of a prior art multiple-laser displacement sensor system within a sensor unit such as shown in FIG. 1.

A laser displacement sensor system 200 such as shown in FIG. 2, consists of an imaging sensor 202 having a field of view FOV to receive reflected light from a surface illuminated by two or more associated laser emitter 204 or other associated light sources aligned in a vertically spaced arrangement on a support stand 206, in a fixed relationship with the imaging sensor 202. The known or determinable vertical spacing between each laser emitter 204 may be uniform, varied, or symmetric. Each laser emitter 204 is configured to project a laser beam 208, preferably parallel to the ground G or vehicle support surface, onto surfaces of the vehicle V passing through the field of view FOV of the associated imaging sensor 202, such that reflected laser light 210 from the surfaces is received on a pixel array 205 of the associated imaging sensor 202 after passing through an appropriate focusing lens or optical system. Additional laser emitters 204 may be utilized to project a plurality of parallel laser beams (for example, defining a grid of illuminated points on the surface of an observed object) which are subsequently reflected onto the pixel array 205 of the associated imaging sensor 202.

Figure 3:
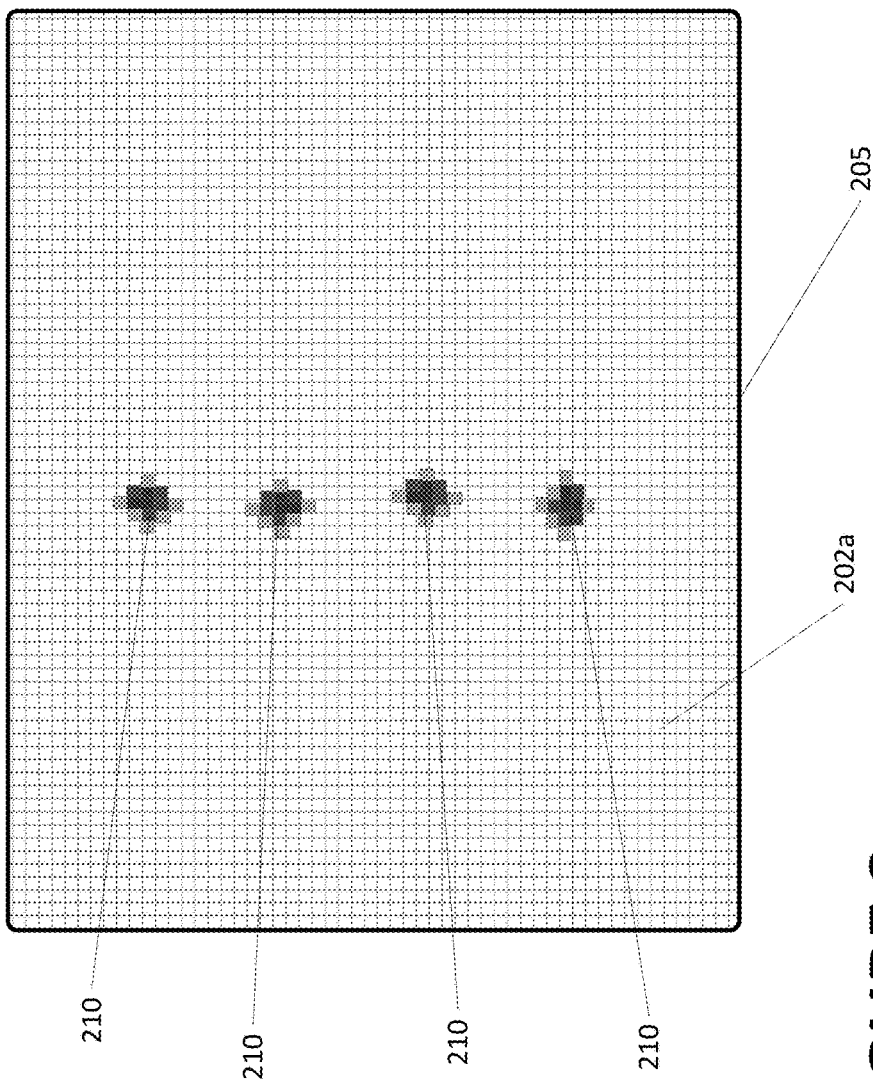
FIG. 3 illustrates an exemplary imaging sensor pixel array of a prior art displacement sensor system such as shown in FIG. 2, with pixels illuminated by reflected laser light from an associated array of lasers.

Within an imaging sensor 202, a distribution and observed characteristics of the reflected laser light 210 received at a pixel array 205 of the imaging sensor corresponds at least partially with the characteristics of the surface from which the laser beams 208 are reflected. As seen in FIG. 3, Spatial locations of the illuminated pixels 202a (individual light sensing elements) along at least one dimension (i.e., a single axis) of the pixel array 205 which receives the reflected light are used to determine the precise linear displacement of the point from which the laser beams 208 were reflected, relative to the light sensing pixel array 205, preferably to a sub-pixel resolution. As the displacement to the observed surface changes along a single axis relative to the stationary pixel array 205 due to movement of the vehicle V, corresponding changes occur in the incident location of the reflected laser light 210 along at least the one dimension (the single axis) of the light sensing pixel array 205. Through image processing, distribution and characteristics of the observed reflected laser light 210 may be used, together with known parameters of the displacement sensor system 200, to triangulate at discrete points in time, the relative spatial location of the specific points of reflection on a surface of the moving vehicle V within the field of view FOV and sensing region 50.

During operation, the laser beams 208 from the individual displacement sensor systems 200 project points of light onto the various surfaces of the vehicle V as the vehicle traverses past the stationary displacement sensor systems 200. Movement of the vehicle V causes the incident points of the stationary laser beams 208 to traverse along contours of the various vehicle surfaces. Positional changes of the reflected laser light 210 received at the light-sensing pixel arrays 205 of each displacement sensor system 200 are analyzed by a controller or processor to provide displacement measurement values associated with the distance between the individual points of reflection from the vehicle surfaces and the displacement sensor system 200, generating a set of data points representing contour plots corresponding to the surfaces of the vehicle V along the measurement axis of each of the laser emitters 204, defined by the individual laser beams 208, such as shown in FIG. 2.

Observed changes in laser spot intensity or laser spot size in each light-sensing pixel array 205 may optionally be analyzed to identify characteristics of the reflecting surface, such as material type, reflectivity, or transparency. The established relationship of the substantially parallel laser beams 208 to each other, i.e., horizontally displaced, vertically displaced, or both horizontally and vertically displaced relative to a reference plane, such as the ground G or vehicle support surface, compared with the observed positions of the reflected laser spots 210 on the light-sensing pixel array 205 provide additional information about the illuminated surfaces. This additional information may include, but is not limited to, an angular orientation between the observed surface and the ground G (such as a camber angle), or the motion of the observed surface relative to the ground G (i.e., vehicle speed).

Each displacement sensor system 200 within a sensor unit 150 acquires displacement measurements associated with an observed set of spaced illuminated points or locations on the side surfaces of a passing vehicle V. A collection of displacement measurements from multiple points or locations on the side surfaces of a passing vehicle V is evaluated using a variety of techniques to obtain average measurements, to discard outlier measurements which exceed a selected tolerance or which show other statistical deviations, and optionally to detect and identify characteristics of vehicle movement which might influence the measurements. Such characteristics of vehicle movement may include, but are not limited to, changes in vehicle velocity (braking or accelerating), oscillations in the vehicle suspension (such as from driving over elevation changes in an inspection lane floor surface), and steering changes as the vehicle V passes through the sensing region 50 in the vehicle inspection lane 10. Additional factors which may influence acquired measurements include, but are not limited to, wheel assembly runout, tire sidewall raised letter or features, and tire sidewall non-uniformity.

In order for meaningful information to be obtained from a vehicle inspection system such as described above which employs a plurality of displacement sensor systems 200 within a sensor unit 150, it is necessary for each component of the system to be appropriately calibrated for both linear displacement measurements (i.e., total toe) and angular orientation measurements (i.e., camber).

An initial calibration for a laser based displacement sensor 200 consisting of one or more laser emitters 204 and an associated imaging sensor 202 for observing reflected laser light 210, such as used in drive-through vehicle service or inspection lane, can be done by observing and recording the locations of dots of projected laser light 208 reflected from an optical target surface 300 onto the sensing surface 400 of the associated imaging sensor 202. The locations of the dots can be identified as the coordinates of centroids or other identifiable characteristics of the dots, denoted by pixel coordinates in an X-Y plane of the sensing surface 400. Due to the geometric relationship between the laser emitters 204 and the associated imaging sensor 202, laser light 210 reflected from surfaces at different or varying linear distances from the laser displacement sensor will be received at different locations on the imaging sensor surface 400, which vary along at least one axis of the X-Y plane of the sensing surface in a determinable relationship to the linear distance. Preferably, the calibration procedure is designed to encompass an operable range of the laser displacement sensor, by acquiring locations, such as centroid coordinates, from an optical target surface 300 disposed at a plurality of discrete distances. These discrete distances preferably include at least one distance which is representative of a closest distance at which a moving vehicle V will pass by the displacement sensor 200 and at least one distance which is representative of a furthest distance at which a moving vehicle will pass by the displacement sensor. A position and tilt of the associated imaging sensor 202 relative to the projected laser beams 208 is initially known or measured using conventional measurement techniques to establish a configuration baseline. From the configuration baseline dimensions, a geometric or trigonometric model relating the range to each laser dot 208 projected onto the optical target surface 300, and the corresponding position of the reflected light 210 received on the associated imaging sensor 202 is established.

Using measured or known distances to the discrete positions of the optical target surface 300 used for the calibration, the observed dot locations, or positions of dot centroids, for points on the imaging sensor surface 400 illuminated by the corresponding reflected light 210 received at the associated imaging sensor 202 are mathematically fitted to the baseline geometric or trigonometric model. The resulting fit values are used to guide adjustments to the measured imaging sensor tilt and associated lens focal length values. For example, a tilt of the imaging sensor 202 is first adjusted until displacement measurements calculated from the dot locations for laser light reflected from the optical target surface 300 disposed at a nearest operable distance onto an associated imaging sensor agree with a conventionally measured distance to the optical target surface. Next, a lens focal length is adjusted until displacement measurements calculated from the dot locations for laser light reflected from the optical target surface 300 disposed at a furthest operable distance onto the associated imaging sensor agree with a corresponding conventionally measured distance to the optical target surface. These adjustments can be iteratively repeated until both conventionally measured distances match, to within an acceptable tolerance, the distances represented by the dot locations observed with the associated imaging sensor 202. Distances to subsequently observed laser dots on vehicle surfaces disposed between the nearest and the furthest operable distances can then be interpolated from corresponding dot locations observed on the imaging sensor surface 400 of the associated imaging sensor 202, using the adjusted model, with sufficient accuracy to determine vehicle wheel assembly toe and camber angle measurements.

In an alternative embodiment, the aforementioned process is implemented using mathematical models of the laser displacement sensor 200 configuration in place of conventional measurements. For instance, using a parametric model that does not require the imaging sensor location or tilt can be employed. Starting with the same two range positions for the optical target surface 300 (i.e., nearest and furthest distances) and the corresponding observations of dot locations or centroid positions on the imaging sensor surface 400, displacement measurements corresponding to intermediate range positions for subsequently observed dot locations or centroid positions are interpolated between the two calibration range positions using an equation in the form of:

$$1/(\text{Range}+\text{Offset}) \qquad \text{Eqn. 1}$$

Preferably, at least a third optical target range measurement and observed dot centroid calibration sample is acquired at a position which is approximately equidistant between the nearest and furthest position samples in order to more accurately determine the offset value for use in subsequent calculations.

In the context of vehicle wheel alignment measurement, camber is defined as a sideways tilt of a wheel assembly relative to a vertical reference. When a camber angle (tilt between two vertically spaced points on a target surface) is measured with laser displacement sensor 200, the calibration requires at least two laser emitters 204 which are aligned generally in the same vertically oriented plane, but at different vertical heights, such as seen in FIG. 2, be calibrated with respect to each other. To calibrate multiple vertically stacked laser emitters 204 in a laser displacement sensor 200 with respect to each other, a planar or flat vertical optical target surface 300 is initially aligned with a reference, such as gravity. Each laser range calibration point will then consist of a distance measured to the vertical optical target surface 300 from a reference laser emitter or other reference point, and the locations of the observed dots or corresponding centroid positions 210 at the associated imaging sensor 202 for each laser beam 208 reflected from the flat vertical optical target surface. Calibrating the lasers emitters 204 together on single flat vertical optical target surface 300 maintains the laser measurements in-sync better than calibrating each laser emitter 204 individually and relying on the accuracy with which the calibration surface itself is moved to different positions. In-sync calibration measurements optimize the calibration for camber, since it is defined as the relative range of wheel-points at different heights.

With three in-sync calibration samples (acquired at different linear distances from the imaging sensor system), accurate calibration can be computed using the above parametric model with terms of the form of Equation (1). Alternatively, the geometric and trigonometric model could be utilized with two calibration samples, together with very precise conventional measurements of the relative positions of the imaging sensor, individual lasers, and the vertical reference surface.

Figure 4:
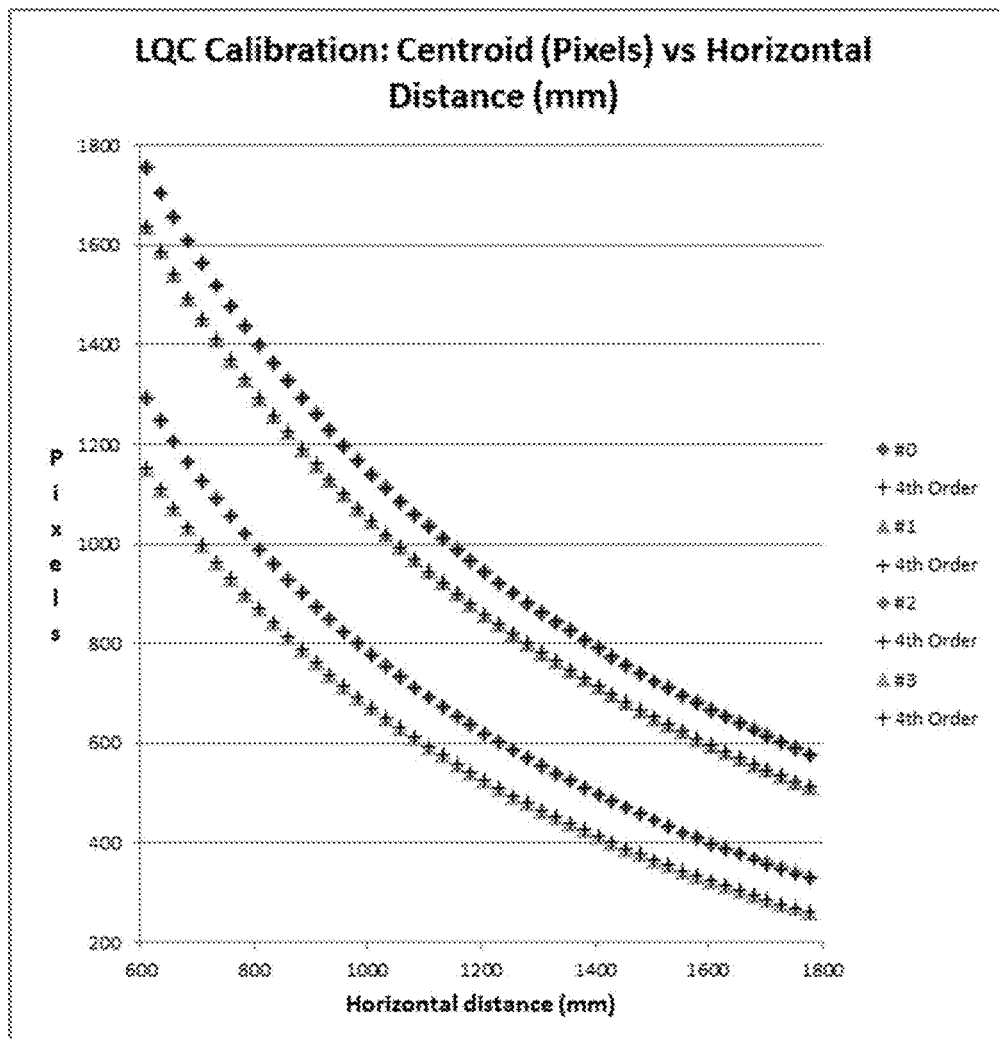
FIG. 4 is a representation of imaging sensor pixel Y-axis position vs. target horizontal distance for the centroids of four lasers emitters, as observed by an imaging sensor, reflected from a calibration target structure placed at a multitude of horizontal distances, illustrating fourth order polynomial curve fitting for each observed laser centroid curve

The laser range finding system model can be greatly simplified if a larger number of calibration samples are acquired, with small changes in the distance to the vertical surface made between adjacent samples. As seen in FIG. 4, a polynomial line is plotted through the locations of the observed dots, or dot centroid positions 210 on the plane of the associated imaging sensor 202 at each measured distance. To interpolate a distance measurement associated with a given dot of laser light reflected from a surface such as a vehicle wheel, the identified pixel location of the observed dot or dot centroid on the imaging sensor is located on the Y-axis of the previously plotted polynomial line, and the corresponding range measurement directly identified from the corresponding X-axis value. This type of system provides a relatively smooth dot location or centroid position to range relationship, such that a polynomial curve fit enables accurate interpolation of ranges for dot locations or centroids positions observed between established calibration points. If the observed dot location or centroid position of a laser dot is moving diagonally on the surface 400 of the imaging sensor 202, the plot axis is best represented by the net distance moved along the imager surface 400, not just a distance along either the x- or y-axis.

Initial calibration of a laser displacement measurement system 200 during manufacture is generally completed in a controlled environment, under known test conditions and with the laser displacement measurement system 200 and optical target surfaces 300 at ideal positions and relative orientations. However, after installation of a calibrated laser displacement measurement system in a vehicle service environment, such as an inspection lane 10, a vertical reference plane of the imaging sensor 202 will likely be orientated at a slight tilt when compared to an ideal factory vertical reference, simply due to variations in the mechanical mountings and floor surfaces G. To adjust for this tilt, a post with an optical calibration target surface 300 can be placed in front of each laser displacement measurement system's vertical stack of laser emitters 204, such that projected laser beams 208 from the laser emitters 204 each strike the common calibration target surface. The calibration target surface is aligned relative at a known orientation to some reference, such as vertically relative to gravity, with a high degree of accuracy, for example by the use of a precision bubble level.

Multiple range measurements to the calibration target surface are then acquired with the laser displacement measurement system 200, with a slight horizontal movement of the calibration target surface towards (or away from) the laser displacement measurement system 200 provided between each set of acquired images. The acquired range measurements are averaged together to generate an accurate line of vertical laser dot locations or centroid positions on the pixel plane of the imaging sensor, averaging out any effects of laser speckle and/or other error sources. A camber angle calibration or correction factor is next established by fitting a line between each of the observed dot locations or centroid positions, and calculating an angular difference between the fitted line and a known line representative of a zero camber surface. The calculated camber angle correction factor is then subtracted from all subsequent camber measurements produced by the newly calibrated stack of laser emitters 204, accounting for an inclination of the laser displacement measurement sensor 200 introduced during assembly or installation.

The camber measurement correction additionally facilitates determination of any tilt between adjacent laser displacement sensors 200 within a sensor unit 150. Determined tilt between the adjacent laser displacement sensors 200 can augment calculations of coordinate transforms between the adjacent laser displacement sensor 200, as described below, and further enables individual stacks of laser emitters 204 in a sensor unit 150 to be replaced in the field and recalibrated after installation.

Replacement stacks of laser emitters installed in the field may require an updated range offset calibration, depending on the specifics of alignment algorithms used. This can be done by placing a flat surface orthogonally across three or more laser beams 208, at least one of which is emitted by the replacement laser emitter stack, and calculating an offset to the expected position of the new laser based on the positions measured by the original laser emitter stack. The offset is the difference between an expected and a measured range.

Calibration of a laser displacement sensor system 200 for camber measurements requires a higher degree of accuracy for the range measurements than does the calibration for simple toe or distance measurements. An option for increasing accuracy is to modify the vertical reference optical calibration target surface 300 to reduce the effects of laser speckle in the light reflected from the surface. In one exemplary embodiment, the optical calibration target surface 300 is moved within a plane generally perpendicular to the laser axes while the dot or centroid locations are observed by the associated imaging sensor 202. Movement of the optical calibration target surface 300 averages the laser speckle patterns resulting from laser illumination of different portions of the surface without altering the range measurements.

Figure 5:
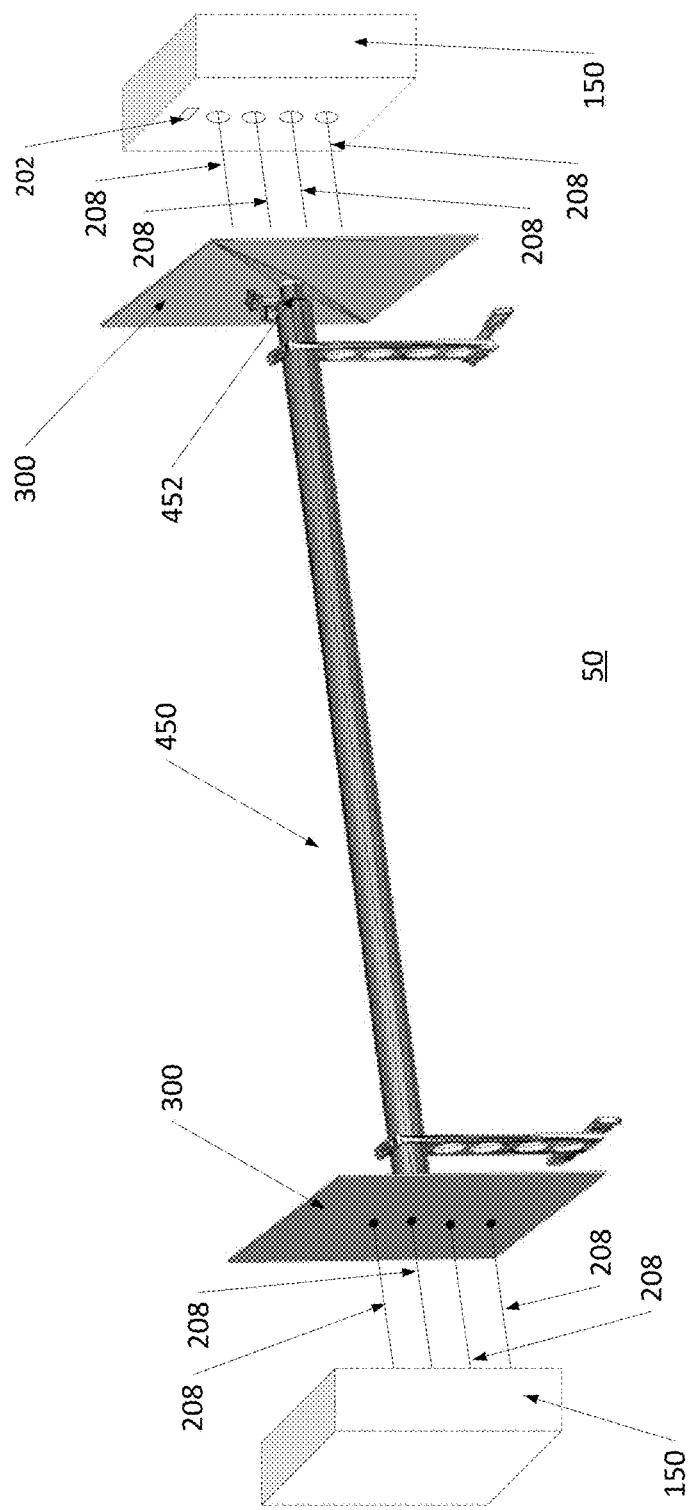
FIG. 5 is a perspective view of an exemplary calibration fixture consisting of a pair of longitudinally spaced and parallel target plates supported for rotation about a common longitudinal axis, positioned within a sensing region between a pair of sensor units (shown in phantom and not to scale)
Figure 6:
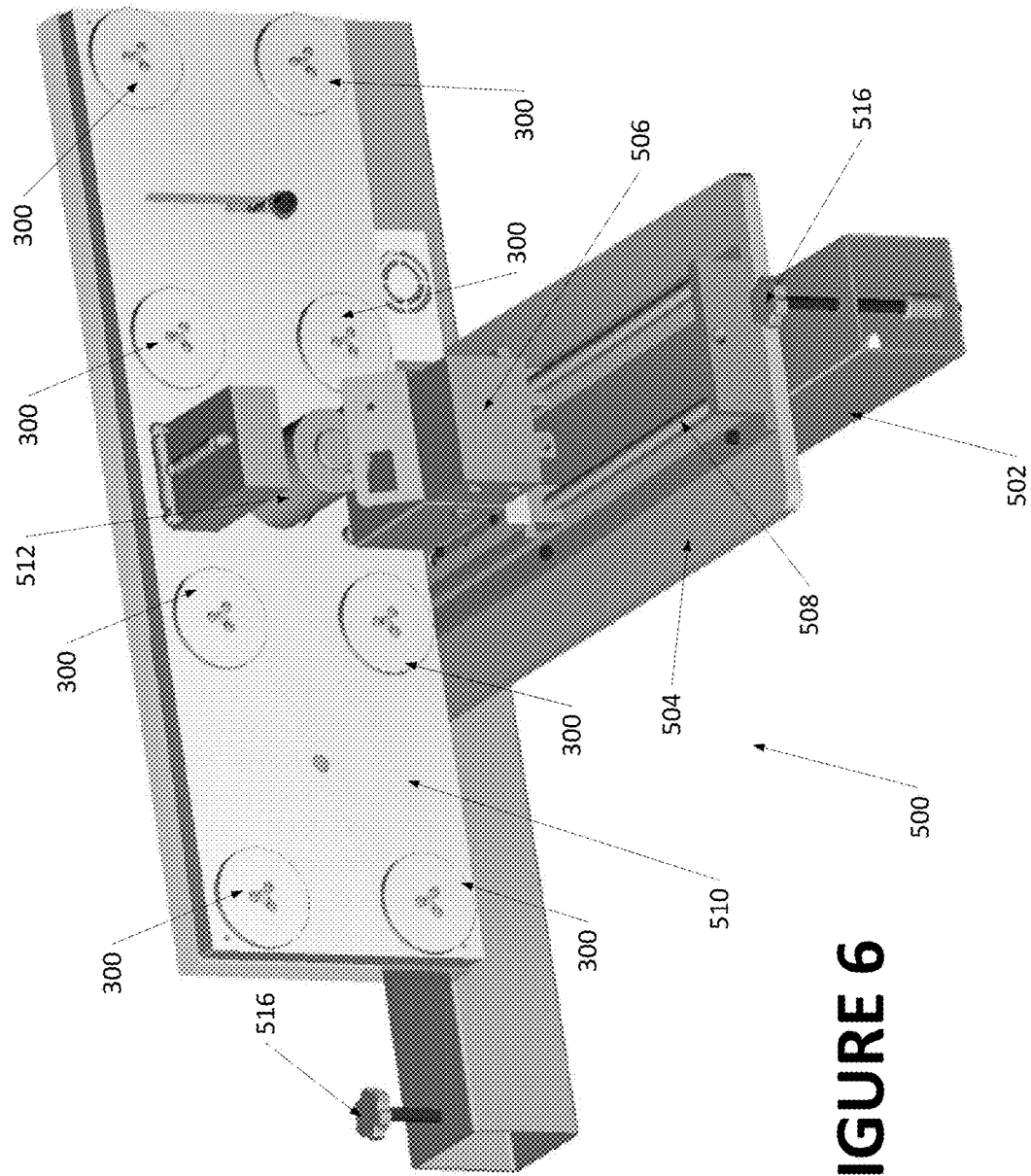
FIG. 6 is a front perspective view of a second exemplary calibration fixture of the present disclosure, configured to provide calibration targets for four laterally spaced pairs of vertically aligned lasers.
Figure 7:
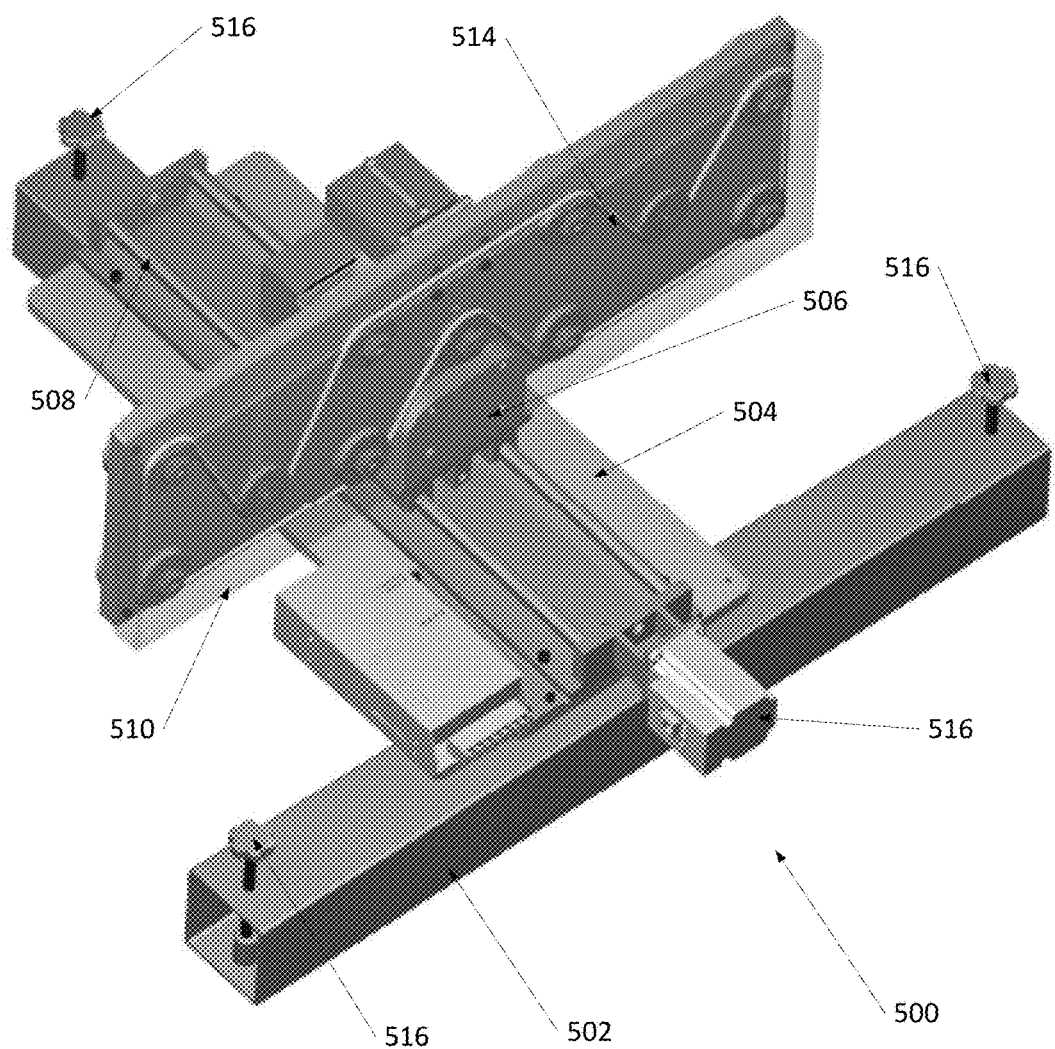
FIG. 7 is a rear perspective view of the calibration fixture of FIG. 6, with some surfaces shown as transparent to reveal the internal mechanisms.

An exemplary laser speckle-reducing optical calibration target surface 300 is a low-runout spinning disc mounted on a preloaded shaft having minimal axial movement. For simultaneous calibration of multiple lasers, a set of spinning optical calibration target discs 300 aligned in the same plane using precision measuring equipment is provided, such as seen in FIGS. 5-7. Alternative motions, such as linear reciprocation perpendicular to the laser axes, can be utilized in place of spinning movement by providing suitable actuation mechanisms. Linear reciprocation requires a repetition of the observation and measurement procedures to obtain a high number of samples, with only small changes in range between adjacent samples, such that the effects of laser speckle are inherently averaged out, eliminating the need to utilize spinning optical calibration targets or surfaces.

The amount of laser speckle that is averaged out is related to the movement speed of the optical calibration target surface 300 relative to the exposure time. Preferably, calibration is performed using a surface moving at a high speed and long exposure times. Optionally, long exposure times may be achieved by acquiring multiple short-exposure images of the moving calibration target surface, and summing or averaging the acquired images together. Laser speckle may be reduced further by a conventional anti-speckle optical element between the laser emitter and observed calibration target surface, or by using laser emitters with less inherent laser speckle, such as VCSELs. However, there is typically a trade-off between inherent laser speckle and laser brightness and cost/reliability.

Camber angle measurements are often referenced with respect to the floor surface on which a vehicle V is disposed, instead of the direction of gravity, since the floor surface G in a vehicle inspection lane 10 may be tilted. However, vehicle alignment specifications are defined for vehicles disposed on a non-tilted surface, such as alignment racks or lifts. Hence, it is necessary to compensate acquired camber measurements for any tilt in the floor surface G, which is imparted to the vehicle wheels, when comparing acquired camber measurements with specification values for a vehicle V undergoing an inspection.

In one embodiment of the present disclosure, laser displacement sensor systems 150L and 150R disposed to observe the left and right sides of a vehicle V passing through an inspection lane 10 are calibrated with respect to the direction of gravity. Using a separate measurement tool, the tilt of the floor surface G of the inspection lane 10 between the laser displacement sensor systems 150 is measured. Exemplary measurement tools for measurement of floor tilt may include bubble levels, electronic tilt sensors, survey equipment, and a level bar mounted on feet which are separated by a width corresponding to an average track width of a vehicle passing through the inspection lane 10. The measured tilt of the floor surface G is used as a correction factor for measurements of vehicle wheel assembly camber acquired by each laser displacement sensor 200 to yield a corrected camber measurement which can be compared with specification values.

An alternate way of correcting or compensating for floor tilt in a vehicle inspection lane 10 is to mount the optical calibration target surfaces 300 for observation onto each end of a calibration bar 450, such as shown in FIG. 5. Calibration measurements acquired from the calibration target surfaces 300 will automatically account for the floor tilt imparted to the calibration target surfaces. Preferably, the calibration target surfaces 300 at each longitudinal end of the calibration bar 450 consist of flat plates that each rotate about a common axis, and which are coupled by a rotatable shaft 452 running between them. During a calibration procedure using the bar-mounted calibration target surfaces 300, two sets of calibration samples are taken, with the calibration bar 450 being rotated approximately 180 degrees about its longitudinal axis between the each sets. Because any vertical tilt of the calibration target surfaces 300 relative to the shaft or coupling 452 of the calibration bar 450 will reverse when the shaft (and the mounted calibration target surfaces) rotate 180 degrees about the longitudinal axis, the two sets of readings can be averaged to compute the zero camber vertical reference plane. The rotating assembly must be stiff enough so that any mechanical droop over the longitudinal length of the calibration bar 450 will be below the level of allowable camber error. Alternatively, sets of calibration samples may be acquired with the bar rotated at 120 degree intervals about the longitudinal axis, or any other integer number of evenly-spaced rotations about the longitudinal axis from the rotation initial position.

For systems 150 with additional laser displacement sensors 200 laterally spaced to illuminate and acquire displacement measurements from the vehicle surfaces adjacent to the first pair of laser displacement sensors 200 disposed on opposite sides of an inspection lane 10, calibration is similar. The processes described above can be repeated for each opposing pair of laser displacement sensors 200. Floor or supporting surface tilt can be measured independently for each pair of laser displacement sensors, as floors often change tilt significantly over a short distance. Toe and camber measurements can be computed independently for each opposing pair of laser displacement sensors or computed from a collection of calibrated measurements obtained from multiple laser displacement sensors on each side of the vehicle.

Additional accuracy can be obtained from a measurement or inspection system 150 in which multiple pairs of laser displacement sensors 200 are calibrated by first calibrating the laser displacement sensors 200 on the left and right sides of a vehicle inspection lane 10 to their own coordinate system, and then calibrating the resulting left and right coordinate systems into a common coordinate system, enabling measurements taken with different pairs of laser displacement sensors 200 to be efficiently combined. To accomplish this, a calibration target surface 300 observed during a calibration procedure must be extended so that all of the laser displacement sensors 200 on each side of an inspection lane both illuminate and observe the calibration target surface simultaneously. Those of ordinary skill will recognize that two separate calibration target surfaces 300 secured in a fixed relationship such as by a calibration bar 450 as shown in FIG. 5 will satisfy the requirement of a single calibration target surface visible to laser displacement sensors on opposite sides of a vehicle inspection lane 10.

Initially, laser dot locations or centroids positions for laser light reflected from each of the illuminating laser dots at one range (distance) are observed and measured simultaneously, after which the calibration target surface 300 is accurately moved either towards or away from the displacement sensor 200, generally along the laser axis of illumination, with no significant changes in pitch or yaw, to at least one subsequent calibration position. The observation and measurement process is then repeated. Observing the calibration target surface 300 with all of the laser displacement sensors 200 on one side of the inspection lane simultaneously enables a coordinate reference frame to be established which is common to all of the laser displacement sensors 200 on that side of the inspection lane 10, with two axes parallel to the optical calibration target surface, one of which is orientated in a vertical direction. Nominal or measured horizontal and vertical coordinates establish the spatial location of the individual laser emitters 204 within the coordinate frame. Optionally, one of the laser emitters 204 can be designated as the origin point or axis of the coordinate frame.

Figure 8:
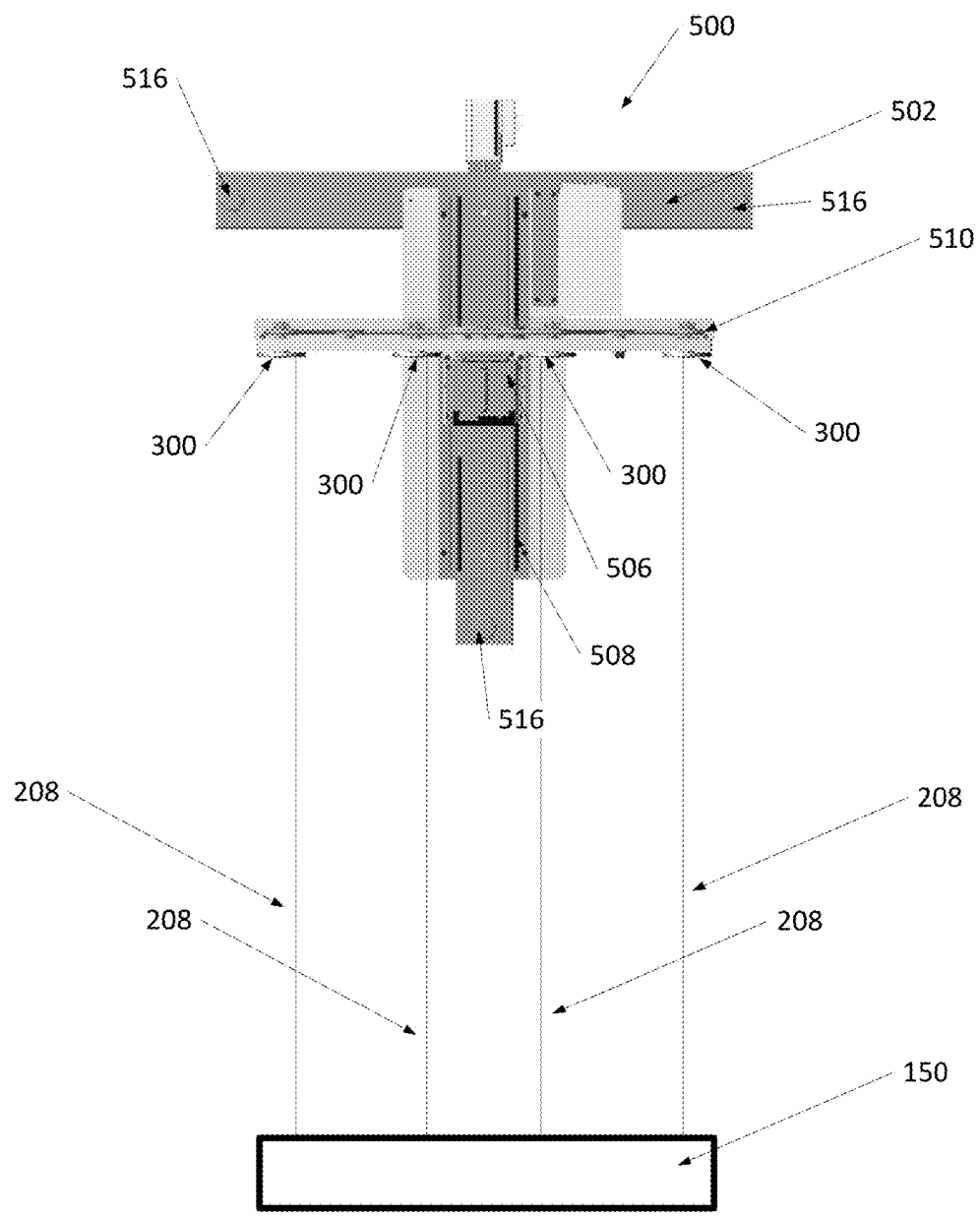
FIG. 8 is a top plan view of the calibration fixture of FIG. 6 in use during a calibration of a laser displacement sensor system.

Turning to FIGS. 6-8, a second exemplary apparatus for assisting in the calibration of multiple laterally separated laser displacement sensors 200, each having at least two vertically spaced laser emitters 204, is shown. The calibration structure 500 consists of a basic frame 502, supporting a slide assembly 504 configured to move a carriage 506 linearly along a slide rail 508. During use, as seen in FIG. 8, the calibration structure 500 is disposed within the operative field of view of the laser displacement sensors 200 in the sensor unit 150, and oriented such that the slide rail 508 is aligned substantially parallel to the laser projection axes of the laser displacement sensors 200. A vertically oriented back plate 510 is mounted on the carriage 506 transverse to the longitudinal axis of the slide rail 508. The back plate 510 supports a set of rotating optical calibration target surfaces 300 in a spaced arrangement facing the laser displacement sensors 200, such that each laser beam 208 emitted by a laser displacement sensor 200 illuminates a point on at least one of the rotating optical calibration target surfaces 300. The rotating optical calibration target surfaces 300 are substantially coplanar with each other, parallel to the back plate 510. Each rotating optical calibration target surface 300 is coupled to an axial shaft mounted in the back plate 510, and is rotationally driven either by an individual motor 512 or by a combination of one or more shared motors and an associated pulley and belt arrangement 514. The carriage itself is configured to move along the slide rail between a near and far position, either manually or via a suitable motorized mechanism 516, positioning the rotating optical calibration target surfaces 300 at various discrete distances from the laser displacement sensors 200.

During a calibration procedure, such as described above and shown in FIG. 8, the calibration structure 500 is placed on a floor surface G within the field of view for a set of laser displacement sensors 200 on one side of a vehicle inspection lane 10, such that the slide rail 508 is parallel the various laser axes for the laser displacement sensors 200. Leveling feet or supports 516 beneath the slide rail are adjusted to compensate for uneven features in the floor surface G and to place the back plate 510 in a vertical orientation, such as relative to gravity or another suitable reference plane. The carriage 506 is positioned at an initial position on the slide rail 508 to enable a first set of measurements of the rotating optical calibration target surfaces 300 to be acquired using the laser displacement sensors 200. The initial position is preferably at one end of the slide rail. After the initial set of measurements are acquired, the carriage position on the slide rail is altered to change the displacement from the laser displacement sensors 200, and at least one additional set of measurement is acquired.

Optionally, the carriage 506 is moved in a step-wise manner between each set of measurements until the back plate 510 has been displaced over the maximum range permitted by the slide rail or the desired operating range of the laser displacement sensors 200. If the maximum range of movement provided by the slide rail does not cover the entire operating range for the laser displacement sensors 200, the entire calibration structure 500 can be repositioned at a new distance from the laser displacement sensors 200 within the field of view, and the process repeated to acquire additional measurements to the rotating optical calibration target surfaces 300. The collected data can be stitched together by being fitted to a polynomial curve correlating the observed locations of the laser dots or centroids positions on the associated imaging sensor surfaces 400, such as shown in FIG. 4, enabling data from both positions of the calibration structure to be utilized in a single calibration process.

Once all of the measurement sets are acquired, the data is processed by a suitably configured processing system to establish the various calibration and correction factors for individual laser emitters 204 and laser displacement sensors 200 as described above.

In a further alternate configuration, a calibration target surface 300 may consist simply of a planar material hung or positioned in a precise vertical orientation within the operative field of view of the set of laser displacement sensors 200. The planar material, such as rubber, may be selected to have desired optical characteristics, such as uniform reflectivity or reduced laser speckle. Measurements of the range to the planar material from each laser displacement sensor 200 can be cross-referenced with a known distance at which the planar material is disposed, and a suitable polynomial curve-fit calibration carried out for observed laser centroids 210 on the associated imaging sensors 202. If the planar material is suspended from a frame or structure, it may be necessary to account for any pendulum-like movement of the planar material during the acquisition of measurements.

Once appropriate range calibration procedures are completed for a set of laser displacement sensors 200, a next step is to ensure that laser displacement sensors systems 150L and 150R on opposite sides of a vehicle inspection lane 10 are installed parallel to each other at some height above the floor or vehicle support surface G. Controlling the parallel relationship to a high degree of precision enables improved tracking of the wheels on an axle as they pass between the installed laser displacement sensors 200 on opposite sides of the vehicle inspection area 10. This can be done using a calibration bar 450 such as described above and shown in FIG. 5.

With one set of laterally spaced laser displacement sensors 200 mounted within sensor system 150L in place within the vehicle inspection lane, the second set of laterally spaced laser displacement sensors 200 mounted within sensor system 150R is installed on the opposite side of the inspection lane 10 such that a distance between the forwardmost sensor 200 (in the direction of vehicle travel) in each system 150L, 150R is equal to the distance between the rearmost sensor in each system 150L, 150R. The distance is set using the two calibration target surfaces 300 on the calibration bar 450 to calculate a first distance between the forwardmost sensors. A position of one of the systems 150L or 150R is then adjusted until the observed distance between the rearward sensors 200 equals the first calculated distance. Lasers displacement sensors 200 at the same height should be used since there can be a relative tilt in the vertical reference planes between the sensor systems 150L, 150R on opposite sides of the inspection lane 10. By recording the observed distances to the calibration target surfaces 300 for each laser displacement sensor 200, and measuring the distance between them, this operation calibrates the distance between the individual laser displacement sensors 200 on opposite sides of the inspection lane 10, enabling calculation of vehicle parameters such as track width.

Once the laser displacement sensor systems 150L and 150R are installed on opposite sides of a vehicle inspection lane 10, it is necessary to establish a common reference coordinate frame for acquired measurements. In an embodiment of the present disclosure, a procedure for establishing the common reference coordinate frame requires a set of posts to be positioned with vertical surfaces in front of each of the laser displacement sensors 200, such that each emitted laser 208 strikes the vertical surfaces. The spatial locations of the observed laser dots reflected onto the associated imaging sensors 202 are then measured in a common coordinate frame using a three-dimensional digitizer based on stereo cameras, using the actual laser dot images as targets.

By rotating each the vertical surfaces roughly 45 degrees from the laser displacement sensors 200 towards the three-dimensional digitizer, each of the laser dots projected onto the vertical surfaces can be simultaneously observed and measured by both the three-dimensional digitizer and the associated imaging sensors. Mathematically translating the laser dot locations measured by the three-dimensional digitizer toward the associated laser emitters 204 by the distance measured with the associated imaging sensors 202 will place the laser dot locations on the range=0 plane of the laser sensor coordinate frames for each side of the inspection lane 10. The direction of translation is determined by geometrically modeling the expected configuration of the laser displacement measurement system 200, and translating directly toward the laser emitters 204, or by moving the vertical posts a significant distance to produce two images of the same laser dots, which establishes a vector direction of translation. This additionally yields height, spacing, and direction of each emitted laser beam 208, which can be used to better track each wheel of a vehicle V as it moves through the vehicle inspection lane 10. A complete coordinate transform between the laser displacement sensor coordinate frames on opposite sides of the vehicle inspection lane 10 can then be determined from the multiple points known in the three different coordinate frames.

While methods for measuring relative positions for the installed laser displacement measurement systems 200 directly measure the projected laser dot positions, such as with theodolites, it will be recognized that alternate methods of measuring the relative positions of the laser displacement sensor coordinate frames on opposite sides of the vehicle inspection lane 10 to the required levels of accuracy may be employed without departing from the scope of the disclosure. Relative laser displacement sensor 200 positions can also be measured by indirect means, requiring an additional step of precisely aligning a three-dimensional target with each emitted laser beam 208, such that the measurement system can then observe the position of that target in space as a proxy for the position of the projected laser dot. Alternate methods can then be utilized to find the spatial locations of this type of target, including measuring tapes, laser scanners, photogrammetry, and Lidar.

In a further alternative procedure, multiple permanent three-dimensional targets are installed on the laser displacement sensor units 150, and the locations thereof measured in the associated laser displacement sensor coordinate frames. This can be done with capital equipment involving custom fixtures, targets, and measuring systems, such as coordinate measuring machines. Subsequently after installation in a vehicle inspection lane 10, a three-dimensional digitizer can by utilized to find these targets in its own coordinate frame, and their saved positions in the associated laser displacement sensor array coordinate frames used to compute a relative transform between the laser displacement sensor units 150L and 150R on opposite sides of the vehicle inspection lane 10.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for calibrating a laser displacement sensor of a vehicle alignment inspection system, the laser displacement sensor consisting of at least one laser emitter configured to illuminate a vehicle surface with a laser beam along a measurement axis, and an associated imaging sensor configured to receive reflected laser light from said vehicle surface on a sensing surface, comprising:
   positioning a calibration target having first and second planar surfaces within a drive-through vehicle inspection lane at a known distance from said laser displacement sensor, within an operative field of view of said associated imaging sensor;
   establishing a spatial model from said known distance and said associated imaging sensor configuration, said spatial model identifying a calibration location on a plane of said sensing surface for a dot of laser light from said laser beam reflected off said calibration target first planar surface positioned at said known distance;
   illuminating a point on said calibration target first planar surface with said laser beam;
   identifying, on said sensing surface plane, an actual location for said dot of laser light reflected from said calibration target first planar surface;
   responsive to a displacement between said actual location and said calibration location on said plane of said sensing surface, altering said configuration of said associated imaging sensor to align said reflected laser light dot with said calibration location to within a tolerance.

2. The method of claim 1 wherein said step of altering said configuration of said associated imaging sensor includes adjusting at least one of an orientation of said sensing surface about at least one axis and a location of said sensing surface along at least one axis.

3. The method of claim 1 wherein said step of altering said configuration of said associated imaging sensor includes adjusting at least one of a focal length, focus, or f-stop setting of an optical element of said associated imaging sensor.

4. The method of claim 1 further including the step of moving said calibration target first planar surface orthogonal to said emitted laser beam during said step of identifying, said movement of said calibration target first planar surface consisting of either reciprocating linear motion or rotational motion.

5. The method of claim 1 wherein said sensing surface consists of at least a one-dimensional array of light-sensitive pixels; and
   wherein identifying said actual location of said dot of laser light on said sensor surface includes calculating, to sub-pixel resolution, a centroid location for said dot of laser light in at least one dimension of said array of light-sensitive pixels.

6. A method for calibrating and utilizing a laser displacement sensor of a vehicle alignment inspection system, the laser displacement sensor consisting of at least one laser emitter configured to illuminate a point on a vehicle surface with a laser beam along a measurement axis, and an associated imaging sensor configured to receive reflected laser light from said point on said vehicle surface within a field of view encompassing a portion of a vehicle inspection lane, comprising:
   positioning a calibration target having first and second planar surfaces within a drive-through vehicle inspection lane at a first distance from said laser displacement sensor, along said measurement axis of said laser beam and within said operative field of view of said associated imaging sensor;
   illuminating a point on said calibration target first planar surface with said laser beam;
   identifying, on a pixel array of said associated imaging sensor, a corresponding location of a dot of said laser light reflected from said calibration target first planar surface;
   repositioning said calibration target first planar surface to a second distance from said laser displacement sensor along said measurement axis, within said operative field of view of said associated imaging sensor;
   repeating said step of identifying; and
   using said first and second distances along said measurement axis, together with said corresponding identified locations on said pixel array, establishing a parametric model for distances associated with laser dot locations on said pixel array of said associated imaging sensor corresponding to laser light reflected from vehicle surfaces at unknown distances along said measurement axis and within said operative field of view of said associated imaging sensor.

7. The method of claim 6 further including the step of measuring a vehicle surface positioned at an unknown distance along said measurement axis from said laser displacement sensor, and within said operative field of view;
   identifying, on said pixel array of said associated imaging sensor, a current location of a dot of laser light reflected off said vehicle surface; and
   interpolating a distance from said laser displacement sensor to said vehicle surface along said measurement axis using said identified current location and said established parametric model.

8. The method of claim 6 further including the step of moving said calibration target first planar surface orthogonal to said emitted laser beam during said step of observing, said movement of said target surface consisting of either reciprocating linear motion or rotational motion.

9. A method for calibrating a laser displacement sensor of a drive-through vehicle alignment inspection system, the laser displacement sensor consisting of a plurality of vertically spaced laser emitters each configured to illuminate a surface of a vehicle within an inspection lane with an associated laser beam, and an imaging sensor configured to receive reflected laser light from said vehicle surface, comprising:
   positioning a calibration target having first and second planar surfaces at a known distance from said laser displacement sensor, within an operative field of view of said imaging sensor, said calibration target surfaces aligned to a reference orientation;
   identifying locations on said imaging sensor of laser light dots from laser light reflected off said calibration target first planar surface from each of said plurality of vertically spaced laser emitters;
   selecting one of said vertically spaced laser emitters as a reference, such that an identified location for a laser light dot on said imaging sensor associated with laser light emitted by said reference laser emitter defines a reference displacement to said calibration target first planar surface; and
   using said reference displacement to said calibration target first planar surface, establishing a reference displacement offset value for each of said remaining vertically spaced laser emitters based on said identified locations of said associated reflected laser light dots on said imaging sensor.

10. The method of claim 9 further including the step of moving said calibration target first planar surface orthogonal to at least one of said associated laser beams during said step of identifying, said movement of said first planar surface consisting of either reciprocating linear motion or rotational motion.

11. The method of claim 9 further including:
repositioning said calibration target first planar surface to at least one additional known distance from said laser displacement sensor within an operative field of view of said imaging sensor;
identifying corresponding locations for each of said associated reflected laser light dots on said imaging sensor from said laser light reflected off said calibration target first planar surface at said at least one additional known distance; and
using said identified corresponding locations, said reference displacement offset values, and each of said known distances, establishing for each vertically spaced laser emitter, a parametric model representative of distance measurements for observed laser dots on said associated imaging sensor reflected from vehicle surfaces positioned at unknown distances from said laser displacement sensor within said inspection lane.

12. The method of claim 11 wherein said steps of repositioning and identifying are repeated a plurality of times before establishing said parametric model.

13. The method of claim 11 further including the step of measuring a surface of a vehicle disposed at an undetermined position within said field of view;
identifying, on said imaging sensor, locations for reflected laser light dots from said laser light reflected off said vehicle surface; and
interpolating at least one measure of displacement to said vehicle surface from said laser displacement sensor using said identified locations and said established parametric model.

14. A method to correct measurements for installation tilt of a vehicle alignment inspection system laser displacement sensor in a drive-through vehicle inspection lane, said laser displacement sensor consisting of a plurality of vertically spaced laser emitters each configured to illuminate a passing vehicle surface with an associated laser beam, and an imaging sensor configured to receive reflected laser light from said passing vehicle surface, from which distance measurements to said passing vehicle surface are determined, comprising:
installing said laser displacement sensor in an operative position within said drive-through vehicle inspection lane, having a field of view through which a vehicle undergoing inspection passes;
positioning a calibration target having first and second planar surfaces within said operative field of view, said calibration target surfaces aligned to a known orientation;
observing, on said imaging sensor, a location of a dot of laser light reflected off said calibration target first planar surface for each of said vertically spaced laser emitters;
using said observed dot locations, identifying a linear representation of said calibration target first planar surface on said imaging sensor;
comparing an angular orientation of said identified linear representation on said imaging sensor to an angular orientation of a predetermined line on said imaging sensor representative of a surface at said known orientation; and
establishing a camber angle calibration value for said installed laser displacement sensor from said angular orientation comparison, wherein an addition of said camber angle calibration value to camber angle measurements of vehicle surfaces subsequently calculated from distance measurements acquired by said laser displacement sensor corrects for an installation tilt of said laser displacement sensor within said drive-through vehicle inspection lane.

15. The method of claim 14 further including the step of moving said calibration target first planar surface in a plane during said step of observing, said movement consisting of either reciprocating linear motion or rotational motion.

16. The method of claim 14 wherein said known orientation for said calibration target surfaces is either a vertical orientation relative to a floor surface or a vertical orientation relative to a direction of gravity.

* * * * *